US012688849B2

(12) United States Patent
Terheiden et al.

(10) Patent No.: US 12,688,849 B2
(45) Date of Patent: Jul. 21, 2026

(54) CONVERSATIONAL DIGITAL ASSISTANT

(71) Applicant: SAP SE, Walldorf (DE)

(72) Inventors: Steffen Terheiden, Mannheim (DE); Torben Krieger, Dossenheim (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 18/239,474

(22) Filed: Aug. 29, 2023

(65) Prior Publication Data

US 2025/0078831 A1     Mar. 6, 2025

(51) Int. Cl.
 *G10L 15/22*          (2006.01)
 *G10L 15/183*         (2013.01)

(52) U.S. Cl.
 CPC ............ *G10L 15/22* (2013.01); *G10L 15/183* (2013.01); *G10L 2015/223* (2013.01)

(58) Field of Classification Search
 CPC ........ G06F 40/35; G06F 40/56; G06F 9/4484; G06F 9/451; G06F 9/453; G06F 9/541; G06N 20/00; G06N 3/006; G06N 3/0475; G06Q 10/10; G10L 15/183; G10L 15/22; G10L 2015/223
 See application file for complete search history.

(56) References Cited

U.S. PATENT DOCUMENTS 9,239,660 B2 *  1/2016  Pineda .................. G06F 3/0481
10,388,285 B2   8/2019  Hirzel et al.

2019/0066694 A1 *  2/2019  Hirzel ..................... G10L 17/22
2023/0118962 A1 *  4/2023  Liu ......................... G06V 20/10
                                                        704/9
2025/0068833 A1 *  2/2025  Wong ................... G06F 40/174

OTHER PUBLICATIONS

Blogs.sap.com [online], "The future about Digital Assistants and Chatbots in SAP S/4HANA Cloud (incl. on premise)" Apr. 8, 2022, retrieved on Aug. 30, 2023, retrieved from URL <https://blogs.sap.com/2022/04/08/the-future-about-digital-assistants-and-chatbots-in-sap-s-4hana-cloud-incl.-on-premise/>, 8 pages.
Wikipedia.org [online], "Large language model" created on Mar. 2023, retrieved on Aug. 30, 2023, retrieved from URL <https://en.wikipedia.org/wiki/Large_language_model>, 18 pages.
Extended European Search Report in European Appln. No. 23194677.3, mailed on Jan. 29, 2024, 7 pages.

* cited by examiner

*Primary Examiner* — Angela A Armstrong
(74) *Attorney, Agent, or Firm* — Fish & Richardson P.C.

(57)          ABSTRACT
The present disclosure relates to computer-implemented methods, software, and systems that can use a language model trained for conversational interaction using natural language prompts. A prompt is received to request a resource from a corporate network environment. First input can be provided to a language model to determine an interface of an application from a set of applications associated with the corporate network environment. In response to determining the interface by the language model, a requirement description of the interface is obtained. Second input is provided to the language model that comprises the obtained requirement description of the interface and the received prompt, and is used as context for generating a network request definition for a request to be directed to the interface. The request is sent to the interface based on the network request definition provided by the language model to obtain the requested resource.

20 Claims, 6 Drawing Sheets

300

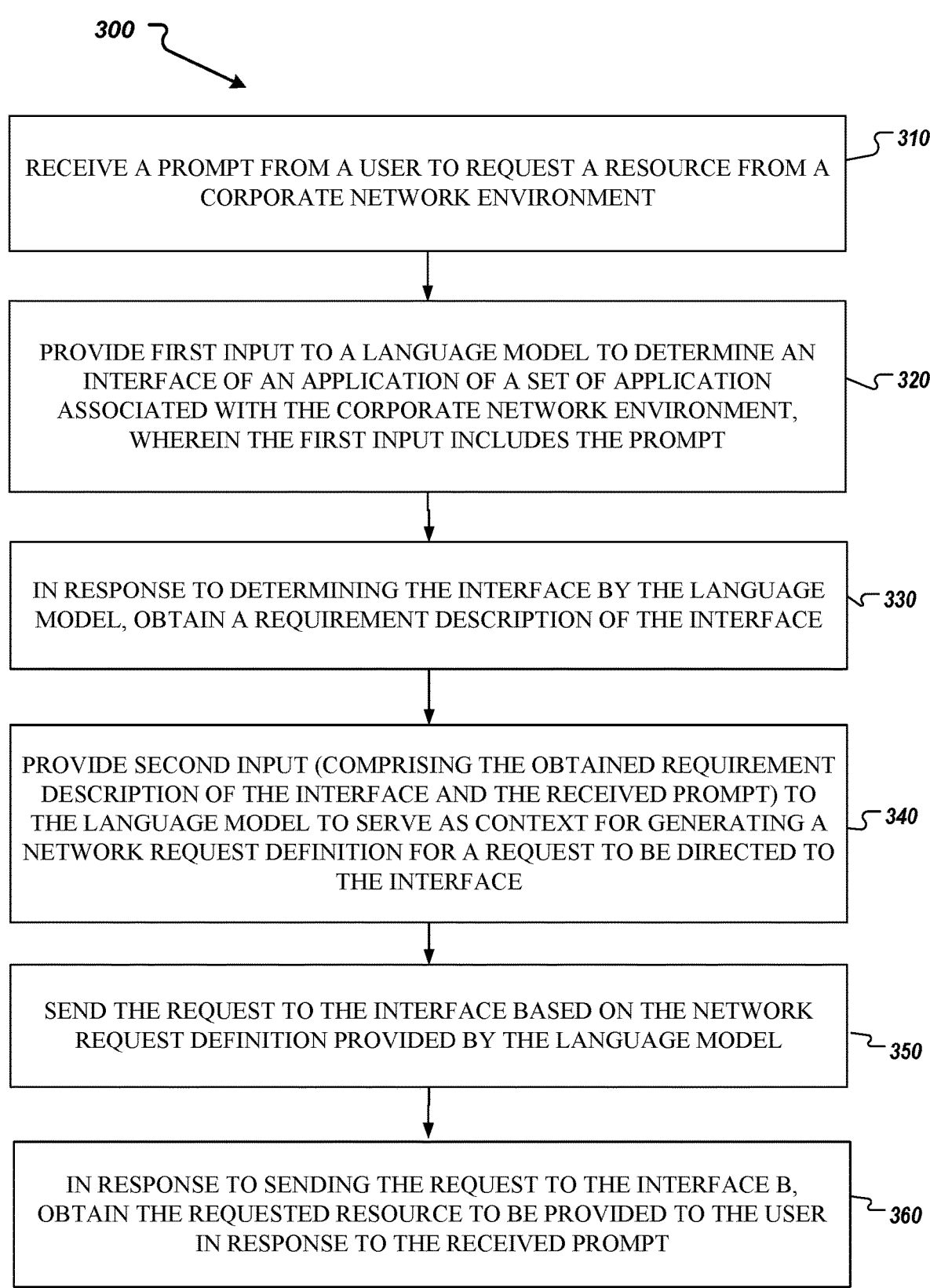

RECEIVE A PROMPT FROM A USER TO REQUEST A RESOURCE FROM A CORPORATE NETWORK ENVIRONMENT ⟍ 310

PROVIDE FIRST INPUT TO A LANGUAGE MODEL TO DETERMINE AN INTERFACE OF AN APPLICATION OF A SET OF APPLICATION ASSOCIATED WITH THE CORPORATE NETWORK ENVIRONMENT, WHEREIN THE FIRST INPUT INCLUDES THE PROMPT ⟍ 320

IN RESPONSE TO DETERMINING THE INTERFACE BY THE LANGUAGE MODEL, OBTAIN A REQUIREMENT DESCRIPTION OF THE INTERFACE ⟍ 330

PROVIDE SECOND INPUT (COMPRISING THE OBTAINED REQUIREMENT DESCRIPTION OF THE INTERFACE AND THE RECEIVED PROMPT) TO THE LANGUAGE MODEL TO SERVE AS CONTEXT FOR GENERATING A NETWORK REQUEST DEFINITION FOR A REQUEST TO BE DIRECTED TO THE INTERFACE ⟍ 340

SEND THE REQUEST TO THE INTERFACE BASED ON THE NETWORK REQUEST DEFINITION PROVIDED BY THE LANGUAGE MODEL ⟍ 350

IN RESPONSE TO SENDING THE REQUEST TO THE INTERFACE B, OBTAIN THE REQUESTED RESOURCE TO BE PROVIDED TO THE USER IN RESPONSE TO THE RECEIVED PROMPT ⟍ 360

*FIG. 3*

CONVERSATIONAL DIGITAL ASSISTANT

TECHNICAL FIELD

The present disclosure relates to data processing, artificial intelligence, and generating network requests to query applications.

BACKGROUND

Customers' needs are transforming and imposing higher requirements for process execution. Technical landscapes are growing to include systems with different technical requirements. Also, technical landscape support high availability to access software resources provided by an underlying software platform. Artificial intelligence (AI) finds implementations in different use cases in the context of data processing at technical platforms. Machine learning (ML) models may be trained to allow conversational interactions with user computers.

SUMMARY

Implementations of the present disclosure are generally directed to computer-implemented method executed by a digital assistant that can use language models trained for conversational interaction using natural language prompts.

One example method may include operations such as receiving a prompt from a user to request a resource from a corporate network environment; providing first input to a language model to determine an interface of an application from a set of applications associated with the corporate network environment, wherein the first input includes the prompt; in response to determining the interface by the language model, obtaining a requirement description of the interface; providing second input to the language model, the second input including the obtained requirement description of the interface and the received prompt, wherein the second input to the language model is to serve as context for generating a network request definition for a request to be directed to the interface; sending the request to the interface based on the network request definition provided by the language model; and in response to the sending of the request to the interface, obtaining the requested resource to be provided to the user in response to the received prompt.

Implementations can optionally include one or more of the following features. In some instances, third input can be provided to the language model to request generation of a human readable output. The third input can include the requested resources and the received prompt. In some instances, the third input can include a definition of a format of a user interface supported by the digital assistant to be used for generating the human readable output.

In some instances, in response to receiving the generated human readable output from the language model based on the third input, the generated human readable output can be provided at a user interface of a display device coupled to the digital assistant. The generated human readable output can be provided as interactive content. The language model can be provided with a plurality of descriptions for a plurality of interfaces provided by the set of applications in the corporate network environment to be used as context when processing the first input.

In some instances, obtaining the requirement description of the interface include obtaining text content of a specified resource mapped to the interface. The method can include maintaining a mapping between interfaces provided by the set of applications associated with the corporate network environment and resources providing content usable for obtaining requirement descriptions of the interfaces. In some instances, obtaining the requirement description of the interface can include executing a search at an online resource provider based on querying using a name of the interface; and obtaining technical definition of the interface and example source code.

In some instances, the technical definition of the interface that is provided to the language model can include a textual description of the interface including (i) a list of possible attributes and (ii) a respective format for defining a request directed to the interface, and wherein the generated network request definition is based on the format as provided with the second input including the textual description of the interface.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 3 is a flowchart for an example method for obtaining resources based on a conversational flow defined at a digital assistant to support execution of requests directed at applications in a corporate network environment in accordance with implementations of the present disclosure.

DETAILED DESCRIPTION

Figure 1:
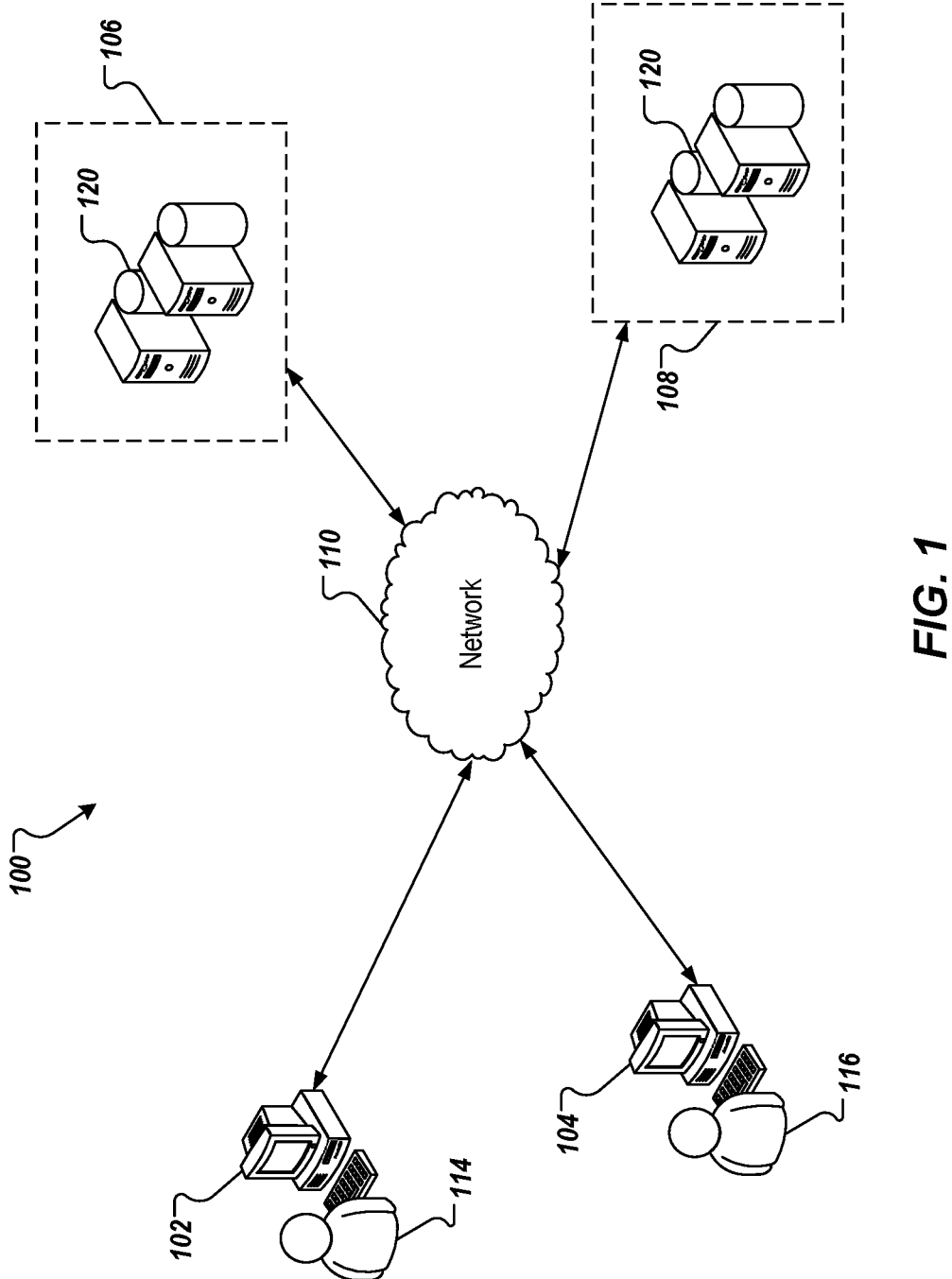
FIG. 1 depicts an example system that can execute implementations of the present disclosure.

The present disclosure describes various tools and techniques for implementing a digital assistant that can use language models trained for conversational interaction using natural language prompts. The described tools and techniques can facilitate network communication with various applications having different techniques requirements and specifications for communication.

In accordance with the implementations of the present disclosure, a digital assistant can be implemented to interpret instructions provided by users in a natural language format without technical considerations for the requirements and specifications of the underlying infrastructure that can provide the requested resources. The user can request resource through the digital assistant that are provided from various applications having specific constraints and communication protocols. In some instances, a digital assistant can use a language model to determine an interface provided by an application (or service) in a network environment including multiple applications or services, where the interface is associated with a request received at the digital assistant. In some instances, the interface can be an application programming interface (API) that allows systems or applications to communicate, as the API provides a language and definition (e.g., syntax) which determine how resources can be requested and/or operations can be performed (e.g., invoke data, delete data, modify data, copy data, or other example operations).

In some examples, the requests received from the user can be for starting service instances at a cloud infrastructure, for example, starting a virtual machine (VM) and installing an application to run on the VM. Such a request can be sent without technical specifics for a particular provisioning service or else that can execute the requested and without a network request that can be used to call the service and request the service instance as a resource to be provided to the user. For example, once the request is completed, the user may be provided with access to an instance of a service that can run in cloud infrastructure and provide services to the user or to other users.

For example, a digital assistant can receive a request to determine a number of employees working at a particular location of a corporation, and the digital assistant can use a language model to determine a relevant interface that can be queried to answer the received question and provide an output number of employees at that location. The language model can interpret the request received at the digital assistant (e.g., defined as a prompt of a user, or as a text input provided by an application, among other example request definitions). In some instances, the language model can be trained to determine a relevant interface to a query based on providing data describing different interfaces provided by different applications running in the network environment that can be requested to provide resources. Further, once a relevant interface that can be queried to obtain the result for the request for the number of employees is determined, the digital assistant can further use the language model to automatically generate a network request definition specific for the interface. The digital assistant can be aware of the applications that provide resources (accessible by the digital assistant and in relation to requests received from users or other external or internal application instances) in the network environment and can supply relevant technical information for the determined interface by the language model together with the request to obtain the request definition that can be used to execute a call at the determined interface.

In some instances, a digital assistant can be implemented to flexibly communicate with a large and dynamically changing corporate network environment including multiple applications relying on different technologies and communication specifications (e.g., protocols and/or syntax). The digital assistant can provide technically accurate requests accurately addressing relevant endpoints (endpoint interface or service endpoint interface exposed as a web service) at applications running at the network environment. The digital assistant can use a trained model to process received requests and timely and efficiently obtain resources to provide results to requests. In accordance with the implementations of the present disclosure, even if the applications provided in the network environment are dynamically changing or growing in number and in complexity of request definitions, the digital assistant can support response execution without delays, efficiently, and with improved accuracy based on the implemented logic for communication with a trained language model that supports digital assistant's operations. Further, the present solution allows users to freely interact with the corporate network environment, and frees them from needing to know specific details regarding the current version of the environment, or have advanced technical knowledge of recent and/or ongoing changes. In such manner, the digital assistant can facilitate processing of requests of users that are dynamically defined to match with the technical specification of a wide technical landscape implementing entities with various technologies, which can dynamically change to support changing needs of customers. Thus, the digital assistant presents a robust solution to improve the execution and processing of requests at a wide technical environment including and integrating various services and applications relying on different technology stacks. Further, the digital assistant support onboarding of user to new applications and services that can be introduced into their corporate network landscape.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In some implementations, the cloud environment 108 can be used to host a system that can be implemented in accordance with implementations of the present disclosure and utilizes machine learning technics and trains a language model that learn from data, natural language processing. The hosted system can include a digital assistant that is coupled to machine learning logic to generate human understandable outputs that address user's requests. The digital assistant that can be hosted either at the cloud environment 108 or else (as an external software component, or at another environment such as the cloud environment 106).

Figure 2:
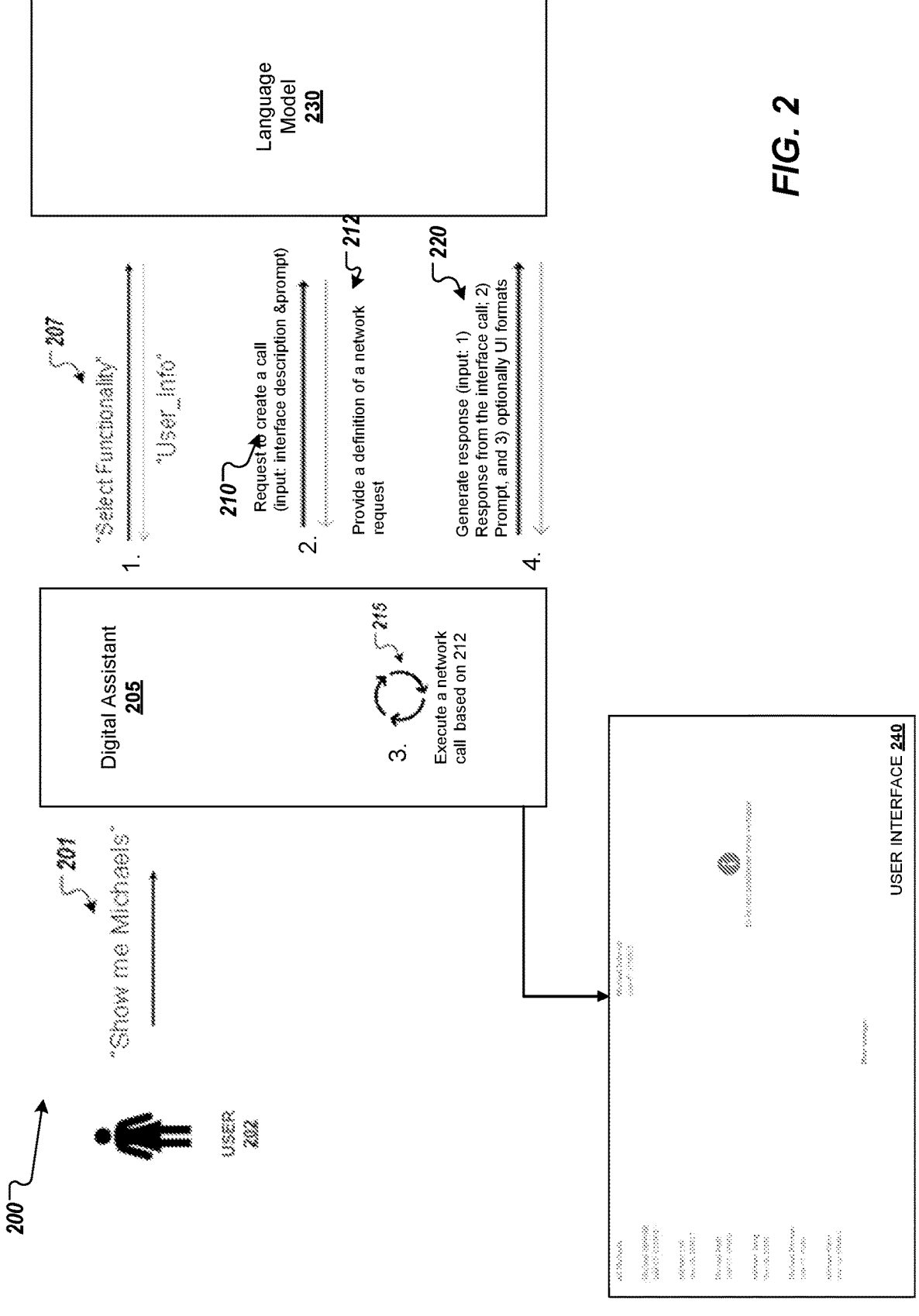
FIG. 2 is a block diagram for an example use case of a digital assistant that provides responses in the context of a corporate network environment.

FIG. 2 is a block diagram for an example use case 200 of a digital assistant 205 that provides responses in the context of a corporate network environment.

In some instances, a corporate network environment can include multiple applications, services, and/or systems that can be at least partially connected and can be accessible and available for providing resources to users of the corporate network environment. The digital assistant 205 can be set up as an assistant associated with at least a part of the applications, services, or systems and can support execution of requests at those system in a smooth and seamless way for end users (or other applications) requesting resources from that part of applications, services, or systems of the corporate network environment. The digital assistant 205 can support a user 202 to obtain resources from an application in the corporate network environment without requiring the user to identify which application is specifically relevant for the user's request for obtaining the resources, and without defining the technical terms and query definition to obtain the requested resource. The applications, services, and/or systems can be defined to provide services and expose interfaces that can be called to obtain those resources. Different applications and services can be provisioned for providing different resources, and can have different technical specifications for receiving requests (e.g., different communication protocols and syntax for request definitions for different operations).

A user 202 can provide a request as a prompt, such as the illustrated "Show me Michaels" 201, that is received at a digital assistant 205. The prompt 201 is an indication for a request for information from a corporate network environment. In some instances, the prompt 201 can be an instruction formed as words or a phrase which can be provided as typed input, as voice input, or as an image including text defining the instruction (e.g., an image where the request is handwritten by a user over a touch pad or other device receiving handwritten input). In some instances, the prompt can be an utterance (spoken words, statement(s), or a voice sound) that includes a set of words of phrases defining an intent for performing an action.

For example, a human resources application can expose interface(s) to request information for employees of an organization associated with the corporate network environment. The human resource application can expose an interface that can allow querying users with a particular input or criteria. For example, the querying can be based on various criteria such as a name "Michael" as shown in the prompt 201 or based on other criteria for searching for users. For example, the searching can be based on properties of the user (e.g., first name, last name, social security number, marital status, or age, among other example employee personal data criterions). In some other instances, the human resource application can expose one or more interfaces that can be queried to obtain data associated with employees based on criteria related to their employment status or organizational role. For example, the human resource application can be called at a functional endpoint interface to provide information for all employees that are with employee role "Manager". A single application or service can provide one or multiple endpoint interfaces that can be called to provide resources. To provide resources, the application or service has to be called in a particular manner according to the technical specification of the interface (i.e., different interfaces can be associated with different syntax and different requirements for input values of parameters).

The digital assistant 205 can obtain the prompt 201 and send the prompt 201 to a language model 230 (alternatively, large language model ("LLM") 230) to determine (at 207) an interface of an application that can provide functionality to request resources as requested (i.e., names of people with name "Michael"). The language model 230 can be provided with short descriptions of all interfaces provided by applications that are accessible (and available) for requests by the digital assistant 205 as context information for the language model 230 to process the prompt 201. In some instances, the language model 230 can be prompted with the short description of all available/accessible interfaces together with the prompt 201 to determine an interface of an application that can provide the requested resources.

For example, the digital assistant 205 can be defined as a system that supports users in communication with a defined set of applications, and, optionally, in a particular context. In some instances, multiple digital assistants can be defined for a large network of applications, where different sets of applications can be defined as corresponding to each digital assistant. In some instances, those different sets of applications can be distinct or partially overlapping. For example, the digital assistant 205 can be associated with a plurality of applications that include a human resources application which can expose multiple interfaces that can be accessed by the digital assistant 205. The information about the different applications and respective instances can be used to provide context to the language model 230 when processing prompts.

When the digital assistant 205 sends a request to the language model 230 to determine interface(s) that provide functionality corresponding to the prompt 201, the language model 230 can provide information for an interface that can be accessed with a request to obtain the information about people with name Michael. The language model 230 can be a probabilistic model of a natural language that can generate a probability of an interface based on the provided prompt 201. The language model 230 can be trained to interpret requests in multiple languages (e.g., the prompt 201 can be provided in German and the digital assistant 205 can send a request to the language model 230 in German as well). Thus, a prompt can be provided in various languages and the language model 230 can process the prompt to identify an interface of an application as a probable match. In the example use case, the language model 230 identifies an interface "User_Info" at an APP1 determined as relevant for the received prompt 201. The APP1 can be one of multiple applications associated with the digital assistant 205 that can be used to obtain resources. In some instances, more than one interface can be determined by the language model 230, where those interfaces can be associated with different applications accessible by the digital assistant.

The digital assistant 205 can obtain the determined interface name-here, "User_Info", and can generate a subsequent request 210 to the language model 230 to request the generation of a network request definition that can be used and sent to the interface "User_Info". To obtain the network request definition, the digital assistant 205 provides as input (within the request 210) the prompt and a description of technical requirements of the interface "User_Info". To provide the input, the digital assistant 205 can execute a search at an online resource to obtain the technical definition of the interface which includes the parameters or attributes relevant for the request. Further, the digital assistant 205 can obtain source code examples for defining requests directed at the interface "User_Info". In some examples, the digital assistant 205 can be configured to search for technical information for interfaces provided by related applications in the network environment at one or more online resources, such as a web portal application with technical data, or a database with data records storing technical descriptions and/or source code examples for executing requests at an interface. In some instances, the digital assistant 205 can be configured to identify resources relevant for a given interface by querying the interface name (e.g., "User_Info) at a database or online service to obtain the relevant description that can be input (with the request 210) to the language model 230.

Based on the provided input (at 210) that includes the description of the interface and the prompt 201, the language model 230 can provide a definition of a network request that can be used to execute a network call at 215.

For example, the obtained definition of the network request can be received in the form similar to the following in network request (1):

(1) Call APP1 for/User?filter=(firstName=Michael) & Select=userID, display name.

The obtained definition can identify the relevant application, APP1, and the syntax for requesting a display of people's full names whose first name is Michael.

The obtained definition can be used to send a request to the interface "User_Info". The request can be defined as a Uniform Resource Locator (URL) that includes information needed to access the resource, i.e., users with a name Michael. In some instances, the obtained definition can include request bodies for executing changing actions at the identifier interface, such as uploading resources, storing data, or other example of requests for storing data enclosed in the body of the message request (e.g., a POST request).

At 215, an application interface can be called based on the obtained network request definition at 212. A response from the application APP1 can be received that includes information about the users with "Michael" as a first name together with information about their userID (as in the request), and those users can be provided with their full name.

The obtained response can be included in a request 220 to generate an output that can be displayed to the user 202. The request 220 can include the obtained response from the executed call 215, the prompt 201, and information about user interface format specifics relevant for the user 202. In some instances, the digital assistant 205 can obtain information about the user interface format specifics by invoking such information from the APP1 itself, from a storage maintaining information for required formats for applications, based on user provided input for formatting requirements, or based on other criteria for visualizing content for user 202, among others.

Based on the request 220, the language model 230 can generate a response and provide it to the digital assistant 205, where the digital assistant 205 can then present the response at a user interface 240. The user interface 240 can display the response with the formatting as generated by the language model 230. In some instances, and based on the first name of "Michael" query described in FIG. 2, the user interface 240 can include the information for users with a name "Michael" in an interactive form, where a user, such as the user 202, can interact with each entity in the list of users and obtain additional information for the particularly selected user. In some instances, the user interface 240 can be an interface of the digital assistant 205 or can be an interface of the APP1 that has been requested to provide the information.

In some instances, the user interface 240 can support multiple languages for providing information to the user 202. The digital assistant 205 can determine the language that is used for the prompt 201 and/or default settings for the user 202, and can provide the response in the user interface 240 in the language of the prompt or as configured as default for the user 202.

FIG. 3 is a flowchart for an example method 300 for obtaining resources based on a conversational flow defined at a digital assistant to support execution of requests directed at applications in a corporate network environment in accordance with implementations of the present disclosure. The method 300 can be executed in a system environment as described in relation to FIG. 1.

In some implementations, the method 300 can be executed at a digital assistant, such as the digital assistant 205 of FIG. 2, that is coupled to a language model (e.g., language model 230 of FIG. 2). The digital assistant executing the method can utilize the logic at the language model to determine proper functional call definitions to interfaces at applications that are to be used to process a request by a user. In some instances, a request can be provided with a prompt (e.g., the prompt 201 of FIG. 2) does not specify the application or technical specifics for obtaining resources from the application. The request for resources can be directed to entities running at a corporate network environment. The digital assistant 205 can shield the technical complexity for obtaining a response to the request from the user by communicating with a language model to determine one or more relevant and available application(s) from multiple available application in the network, and then accurately generate a request (with a proper technical request definition) to obtain the requested resource. The resource can be obtained without requiring additional technical information from the user. Instead, the digital assistant can identify the correct endpoint interface for requesting the resource, and can define and execute a call to obtain the requested resource. Once the requested resource is obtained, the digital assistance can provide a response to the user in a format that complies with user expectations. The digital assistant in the present disclosure provides an improved user experience and facilitates execution of network calls to various different applications more efficiently, as the digital assistant can accurately generate a network request that complies with the technical requirements of an application. Because of the digital assistant, the number of requests executed for applications in the network can be reduced, and the time required for request execution can be improved. Still further, the number of errors when executing requests at an application in a corporate network environment can be reduced, and the application's performance can be improved as fewer requests are received and defined that do not comply with the application's technical requirements, thus avoiding and reducing addition consumption of the processing resources of the application.

Method 300 can be executed in the context of the example use case 200 of FIG. 2, where the digital assistant 205 is the entity that executes method 300, and the language model 230 is the language model that communicates with the digital assistant to serve a user request, such as the request "Show me Michaels" 201 of FIG. 2.

At 310, prompt is received from a user to request a resource from a corporate network environment. In some instances, the requested resource can be a data resource (e.g., in form of text, image, or video content provided by a web application). For example, the prompt can be substantially similar to the prompt 201 of FIG. 2, or can be another request indicating another requested resource. The prompt can provide criteria for determining the resource (e.g., all employees with name "X", all people above 50 years old, all employees who have Chinese nationality, among other criteria) that can be used as predicates for searching at an application that has, stores, or is associated with the data, and that has the exposed interfaces to provide responses to answer the request in the prompt.

For example, in the context of a network environment associated with an entity such as a university, a student's request can be a request for books from a particular author. In that example, the network environment may include an online library that can be called at a particular interface to request the books according to a request definition that complies with the interface requirements. It can be understood that different online libraries can have different technical specifications, and can be called with differently defined requests, to perform similar functionality. Thus, it is important to be aware of the technical specifics of the interfaces provided by a particular application to be able to obtain the resources in an easy and timely manner, which also reduces expenditures for maintaining the infrastructure. For example, if an application or service is called with a request that does not comply with the called interface's specification, the application or service can experience inefficiency as they can process incorrect requests. As a result of trying to execute requests that are improperly defined, new requests may need to be generated and sent by the users to obtain the requested resources, which can create additional overhead for the processing at the application or service.

At 320, first input is provided to a language model to determine an interface of an application of a set of application associated with the corporate network environment. The first input includes the prompt. For example, the first input can be provided as discussed in relation to the selection of the functionality 207 corresponding to the prompt 201 of FIG. 2.

In some instances, the language model can be provided with large amount of data including information about the applications associated with the corporate network environment and interfaces that they expose that can be accessed externally to obtain resources. In some implementations, the language model is a trained model that can obtain a request (e.g., prompt) from the user as well as textual description of each interface available in the network environment and use that as context to identify an interface that matches the request. The prompt of the user as natural text can be used and processed by the language model together with the textual descriptions to determine which interface corresponds to the prompt. The determined interface is an interface that is expected to provide the requested resource based on interpretation of the description of the interface in the context of the received request with the prompt. For example, when the prompt is "Show me Michaels" as described in FIG. 2, the prompt can be interpreted to determine a best match between the prompt and a description of the descriptions provided to the language model In some instances, the prompts are not defined according to a predefined syntax to request resources, but rather as free expressions, where two requests—even if having different or partially overlapping words or phrases—can provide the same result and determination for the same interface. For example, if another user provides a prompt of "display employees with name Michael", this second prompt may result in determination of the same interface even if the prompt is different.

At 330, in response to determining the interface by the language model (e.g., the "User_Info" of FIG. 2), a requirement description of the interface is obtained.

In some instances, obtaining the requirement description of the interface can include obtaining text content of a specified resource mapped to the interface (e.g., technical documentation provided for the interface). In some instances, a mapping between interfaces provided by the set of applications associated with the corporate network environment and resources providing content usable for obtaining requirement descriptions of the interfaces can be maintained at a storage that can be internal or external to the digital assistant. That storage can be a database or other storage type that can be queried based on a name of an interface to obtain relevant requirement descriptions. In some instances, the storage of the mappings can be maintained separately from the digital assistant and the trained language model, so that the data for the technical requirements of interfaces can be updated independently and enhanced with additional details. In some instances, the execution of calls at the applications in the corporate network environment can be monitored, and, in cases where it is evaluated that a number of requests above a threshold number are unsuccessful due to improper definition of the call, the information for the technical requirements of the those interfaces associated with the requests can be updated to include further details that when input to the language model can improve the definition of network requests.

The requirements description can define the syntax that is used to call an endpoint of the determined interface. For example, the requirements description can be obtained from a content provider (e.g., an online provider, an internally network hosted library with documents and data, or an external online resource or a database, among other examples) including technical descriptions of interfaces provided by applications in a corporate network environment. In some instances, the digital assistant can be coupled to a storage where interface requirement descriptions are maintained, and from which those descriptions can be queried and obtained to be used as input to the language model to generate a network request definition for use when calling an application providing the determined interface.

In some instances, the technical definition can be a textual description of the interface including (i) a list of possible attributes and (ii) a respective format for defining a request directed to the interface. In some of those instances, the generated network request definition can be based on the format as provided with the second input including the textual description of the interface.

At 340, second input is provided to the language model. In one example, the second input can substantially correspond to the request sent at 210 of FIG. 2. The second input can include the obtained requirement description of the interface and the received prompt. The second input serves as context for generating a network request definition for a request to be directed to the interface.

At 350, the request as received from the language model is sent by the digital assistant to the interface based on the network request definition provided by the language model. The request execution corresponds to the execution 215 of FIG. 2.

At 360, the requested resource is obtained by the digital assistant. The digital assistant can use the obtained resource to provide it to the user (or application) associated with the request with the prompt.

In some instances, the resource obtained from the application is provided as input (together with the prompt and optionally with formatting requirements) to the language model to obtain from the language model a response generated in a format as expected by the user and formatted as expected by the user. For example, the digital assistant can provide the requested resource in a user interface such as the user interface 240 of FIG. 2. In some instances, the request to the language model can be for generation of a human readable output that can be visualized at the user interface of the digital assistant associated with the user requested the prompt.

Figure 4:
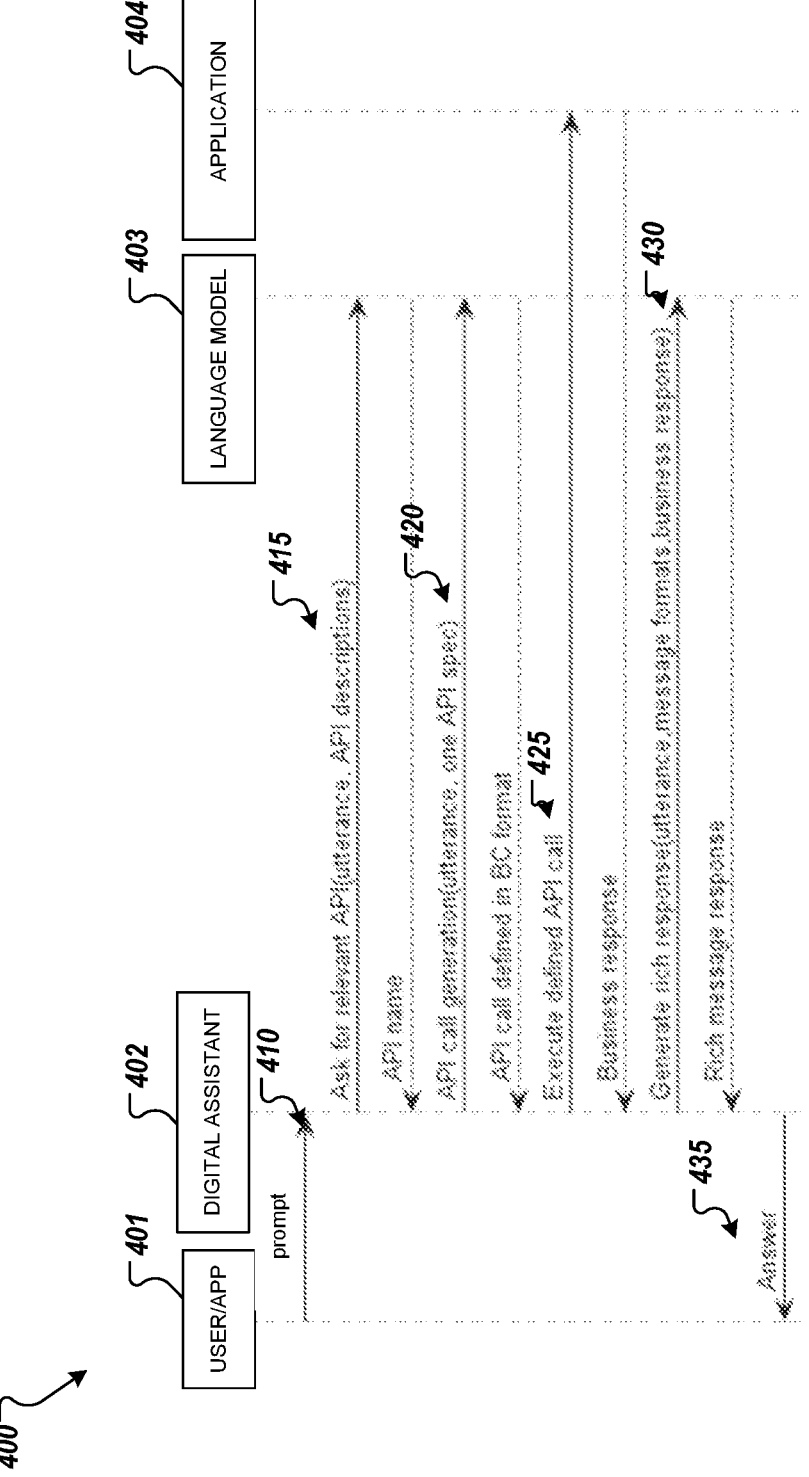
FIG. 4 is a sequence diagram for an example method for generation and execution of network requests to obtained resources based on a digital assistant coupled to a language model in accordance with implementations of the present disclosure.

FIG. 4 is a sequence diagram for an example method 400 for generation and execution of network requests to obtained resources based on a digital assistant coupled to a language model in accordance with implementations of the present disclosure.

In some instances, the method 400 can be executed in relation to a user 401, digital assistant 402, a language model 403, and an application 404. Those components, in some instances, can be substantially similar to the user, digital assistant, the language model, and the application(s) as described in relation to FIGS. 1, 2, and 3. The digital assistant 402, the language model 403, and the application 404 can be executed in relation to a corporate network environment providing resources to users of multiple applications (including the application 404). The method 400 can be executed in a system environment as described in relation to FIG. 1.

A user 401 can send (at 410) a prompt to a digital assistant 402 to request resources. In some instances, the prompt can be sent by an application rather than a user, for example, as a generated request from an application to obtain resources from another application in the corporate network environment.

In some instances, the prompt 410 can be an utterance that includes an instruction provided orally (as a voice command) or as text (e.g., typed or handwritten) by the user 401.

The digital assistant 402 can use the received prompt and provide it to the language model 403 to request (415) a name of an interface that is an API of an application running in the corporate network environment. The language model 403 can be provided with descriptions of various APIs provided by applications in the network environment. The language model 403 can provide a response that includes the API name.

At 420, the digital assistant 402 can request from the language model 403 to generate an API call definition based on providing the prompt 410 and providing an API specification. In some instances, and as described in relation to FIGS. 2 and 3, the API specification can be obtained based on downloading content from an online resource including technical documentation for APIs provided by applications including the applications running and available in the corporate network environment.

At 425, after the digital assistant has received the generated call definition by the language model 403, the digital assistant 402 can send the API call to the application 404, which is the application providing or associated with the API that can be mapped to the API name as determined by the language model in response to the request 415. In some instances, the digital assistant can maintain an internal mapping to identify APIs based on provided names from the language model, as the names identified by the language model may or may not refer to the exact API name. The application 404 can provide a response to the digital assistant, and that response can be used to be provided to the user 401.

In some instances, the received response from the application can be processed to generate a message response in an appropriate format that is defined for providing responses to the user 401. In some instances, the format can be defined as specific to the user 401, to the application 404, to a predefined criteria configured for the digital assistant 402, or another format criteria.

At 430, the received response from the application 404 can be provided to the language model 403 together with the prompt 410, and a definition of the format expected for providing the response. The language model 403 can generate a message response that matches the context of the request for the format and that response can be provided as an answer 435 to the user 401.

Figure 5:
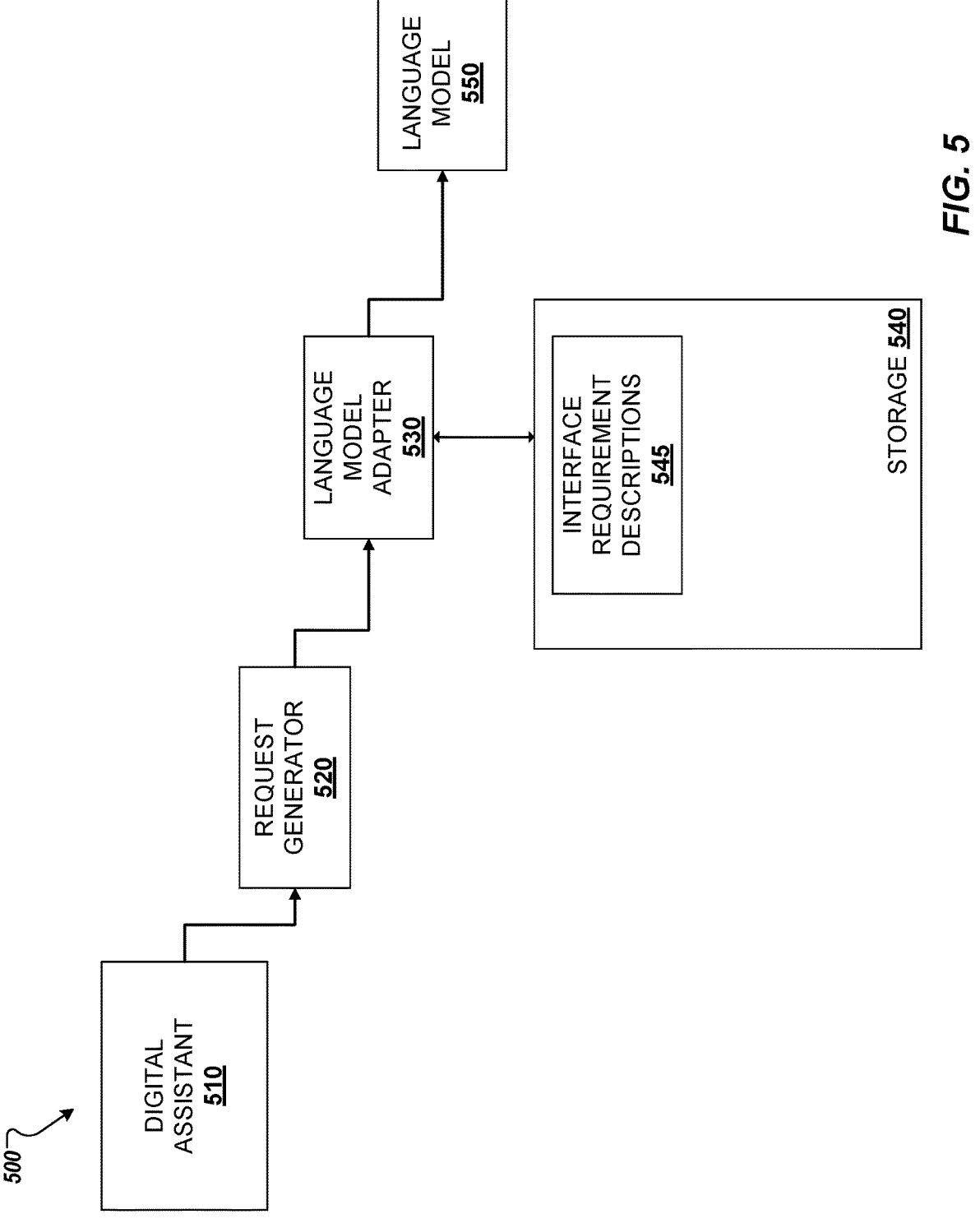
FIG. 5 is a system diagram of a computer environment of a digital assistant coupled to a language model to provide output to users obtained from different systems associated with different technical specifications for communication in accordance with implementations of the present disclosure.

FIG. 5 is a system diagram of a computer environment 500 of a digital assistant coupled to a language model to provide output to users obtained from different systems associated with different technical specifications for communication in accordance with implementations of the present disclosure.

In some implementations, the computer environment 500 can be a computer environment where the example method 300 of FIG. 3 can be executed. The computer environment 500 can be an environment of a corporate network where multiple applications are deployed to provide services to users and a digital assistant 510 is configured to facilitate user requests and provide responses to user requests provided as prompts as verbal instructions.

In some instances, the digital assistant 510 can be coupled to a request generator 520 that can support the digital assistant 510 to define requests that can be directed to different instances of entities (e.g., services or applications as previously described) with which the digital assistant 510 is communicatively coupled. For example, the request generator 520 can define requests that are targeted at a language model 550 that can determine interfaces relevant for received prompts (e.g., including a request from a user as a prompt and description of available interfaces as context for the prompt) and generate request definitions that can be used for executing calls to interfaces provided by applications in the corporate network environment. In one example, the request generator 520 can be configured to generate the requests 207, 210, and 220 of FIG. 2 that are directed from the digital assistant 205 to the language model 230. Also, the request generator 520 can be configured to generate the inputs that are provided to the language model as discussed in relation to FIG. 3. In some instances, the request generator

520 can be configured to generate the requests 415, 420, and 430 of FIG. 4 that are sent to the language model 403.

In some instances, when a request is sent from the digital assistant 510 to the language model 550, the request generator 520 can provide the request to a language model adapter that can support the request generator 520 to determine relevant information that can be included in the input provided to the language model 550. For example, the digital assistant 510 can receive a prompt and request from the language model 550 to determine an interface name that is relevant for the prompt. The request generator can then send the request with the prompt to the language model adapter 530 and the language model adapter 530 can transfer the requests to the language model 550 to determine the name.

The language model adapter 530 can be used to provide data to the language model 550 and provide context to identify relevant interfaces for received prompts. The provided data can include descriptions of available interfaces.

In the cases where the digital assistant 510 obtains the name of the interface and request from the language model 550 to generate a network request definition that can be used by the digital assistant 510 to execute a call at an application's interface, the request generator 520 can define a structure for the request. The structure for the request can include the prompt and the name of the interface. The digital assistant 510 can request from the language model adapter 530 to supplement the request with data including an interface requirement description relevant for the identified interface (based on the determined interface name). The interface requirement description can be obtained by the language model adapter 530 from the interface requirement descriptions 545 that can be stored at storage 540. The language model adapter 530 can obtain the interface requirement description by querying the storage 540 that can provide access to descriptions of various interfaces 545. In some instances, the storage 540 can be a web application that can provide tools for searching online resources including technical descriptions defining requirements for generating network calls to interfaces of applications from the corporate network environment. In those instances, the obtaining of the interface requirement description can be performed through querying description outside of the storage 540. In some instances, the obtained interface requirement description relevant for a particular request can include description obtained from the interface requirement descriptions 545 and description(s) obtained from external resources (e.g., other available network resources). The language model adapter 530 can generate the request to include all the relevant data to be input to the language model 550 to generate a network request that is usable for executing network calls at the identified interface.

Figure 6:
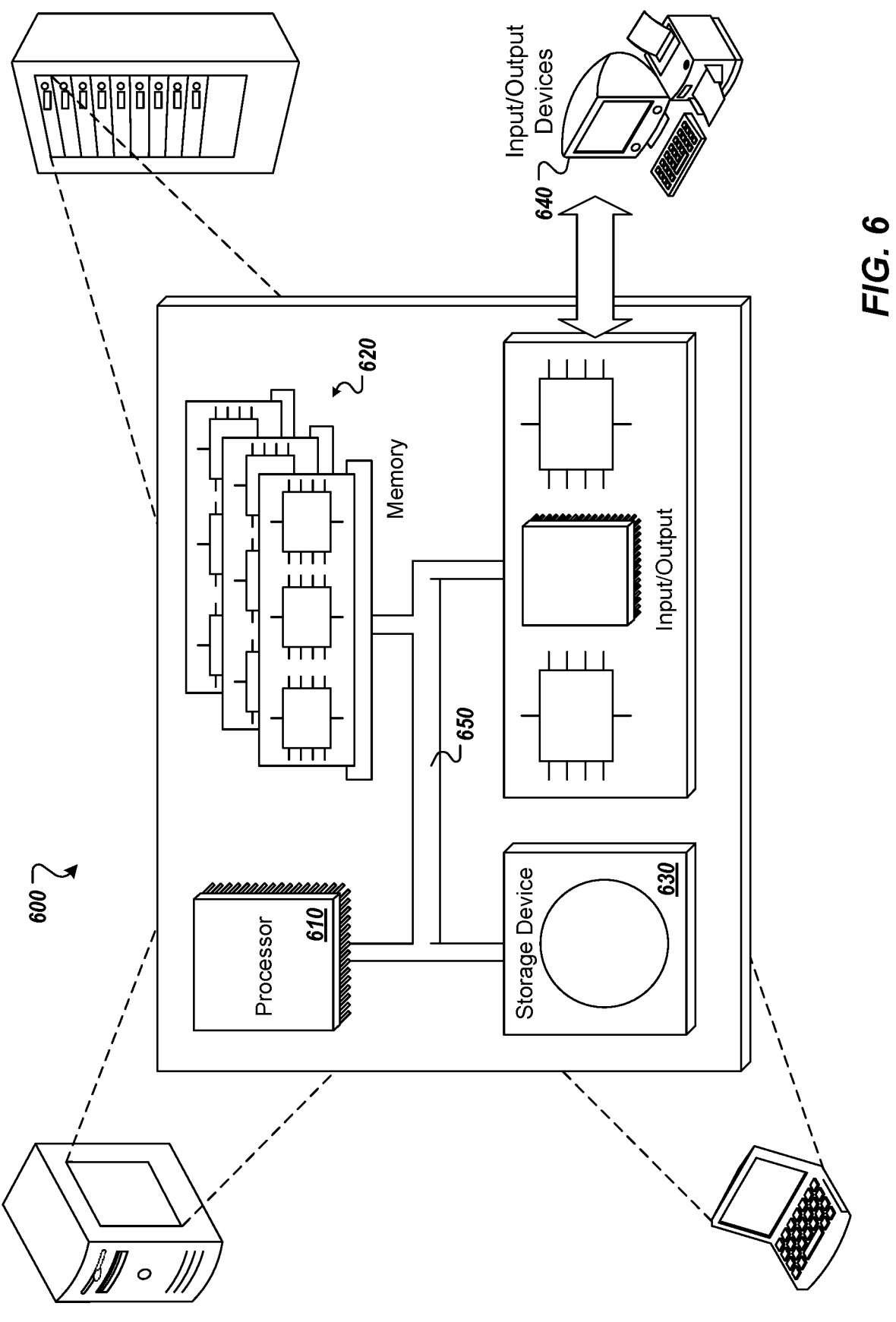
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, and 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

EXAMPLES

Although the present application is defined in the attached claims, it should be understood that the present invention can also (alternatively) defined in accordance with the following examples:

Example 1. A computer-implemented method executed by a digital assistant, comprising:

receiving a prompt from a user to request a resource from a corporate network environment;

providing first input to a language model to determine an interface of an application from a set of applications associated with the corporate network environment, wherein the first input includes the prompt;

in response to determining the interface by the language model, obtaining a requirement description of the interface;

providing second input to the language model, the second input comprising the obtained requirement description of the interface and the received prompt, wherein the second input to the language model is to serve as context for generating a network request definition for a request to be directed to the interface;

sending the request to the interface based on the network request definition provided by the language model; and in response to the sending of the request to the interface, obtaining the requested resource to be provided to the user in response to the received prompt.

Example 2. The method of Example 1, comprising:

providing third input to the language model to request generation of a human readable output, wherein, the third input comprises the requested resources and the received prompt.

Example 3. The method of Example 2, wherein the third input comprises a definition of a format of a user interface supported by the digital assistant to be used for generating the human readable output.

Example 4. The method of Example 2, comprising:

in response to receiving the generated human readable output from the language model, providing the generated human readable output at a user interface of a display device coupled to the digital assistant, wherein the generated human readable output is provided as interactive content.

Example 5. The method of any one of the preceding Examples, wherein the language model is provided with a plurality of descriptions for a plurality of interfaces provided by the set of applications in the corporate network environment to be used as context when processing the first input.

Example 6. The method of any one of the preceding Examples, wherein:

obtaining the requirement description of the interface comprises obtaining text content of a specified resource mapped to the interface; and the method comprises maintaining a mapping between interfaces provided by the set of applications associated with the corporate network environment and resources providing content usable for obtaining requirement descriptions of the interfaces.

Example 7. The method of any one of the preceding Examples, wherein obtaining the requirement description of the interface comprises:

executing a search at an online resource provider based on querying using a name of the interface; and obtaining technical definition of the interface and example source code.

Example 8. The method of Example 7, wherein the technical definition is a textual description of the interface including (i) a list of possible attributes and (ii) a respective format for defining a request directed to the interface, and wherein the generated network request definition is based on the format as provided with the second input including the textual description of the interface.

Example 9. A non-transitory, computer-readable medium coupled to one or more processors and having instructions stored thereon which, when executed by the one or more processors, cause the one or more processors to perform operations according to any one of the methods of claims 1 to 8.

Example 10. A system comprising a computing device; and a computer-readable storage device coupled to the computing device and having instructions stored thereon which, when executed by the computing device, cause the computing device to perform operations according to any one of the methods of claims 1 to 8.

What is claimed is:

1. A computer-implemented method executed by a digital assistant, comprising:

receiving, as a prompt from a user, a user request for obtaining a resource from a corporate network environment;

providing a first input to a language model for processing by the language model to identify a first interface of a first application, from one or more interfaces of each of a set of applications available in the corporate network environment, that matches the user request for obtaining the resource, wherein the first input includes the received prompt and a textual description of each of the one or more interfaces of each of the set of applications;

in response to identifying the first interface that matches the user request for obtaining the resource by using the language model, obtaining a requirement description of the first interface based on executing, by using a name of the first interface, a search at an online resource provider that stores technical documentation for the one or more interfaces;

providing a second input to the language model for processing by the language model to generate a network request definition for a call to be directed to the first interface, the second input comprising the requirement description of the first interface obtained at a result of executing the search at the online resource provider and the prompt received from the user, wherein the second input to the language model is to serve as context for generating the network request definition for the call to be directed to the first interface;

sending the call to the first interface of the first application based on the network request definition generated by the language model;

in response to the sending of the call to the first interface, obtaining the requested resource from the first application; and providing the requested resource obtained by sending the call to the first interface of the first application to the user in response to the received prompt, wherein the first interface of the first application is identified as matching the received prompt by using the language model from the one or more interfaces of each of the set of applications available in the corporate network environment.

2. The method of claim 1, comprising:

providing third input to the language model to request generation of a human readable output, wherein, the third input comprises the requested resources and the received prompt.

3. The method of claim 2, wherein the third input comprises a definition of a format of a user interface supported by the digital assistant to be used for generating the human readable output.

4. The method of claim 2, comprising:

in response to receiving the generated human readable output from the language model, providing the generated human readable output at a user interface of a display device coupled to the digital assistant, wherein the generated human readable output is provided as interactive content.

5. The method of claim 1, wherein obtaining the requirement description of the first interface comprises obtaining text content of a specified resource mapped to the first interface from a storage separate from the language model.

6. The method of claim 1, wherein:

obtaining the requirement description of the first interface comprises obtaining text content of a specified resource mapped to the first interface; and the method comprises maintaining a mapping between interfaces provided by the set of applications associated with the corporate network environment and resources providing content usable for obtaining requirement descriptions of the interfaces.

7. The method of claim 1, wherein obtaining the requirement description of the first interface comprises:

obtaining technical definition of the first interface, wherein the technical definition is a textual description of the first interface including (i) a list of possible attributes and (ii) a respective format for defining a request directed to the first interface, and wherein the generated network request definition is based on the format as provided with the second input including the textual description of the first interface.

8. The method of claim 1, wherein the requirement description of the first interface comprises example source code defining example requests directed at the first interface, and wherein obtaining the requirement description of the first interface comprises:

executing, by using the name of the first interface, a search at a database that stores source code examples defining example requests directed at the one or more interfaces.

9. A non-transitory, computer-readable medium storing computer-readable instructions executable by a computer and configured to perform operations executed by a digital assistant, the operations comprising:

receiving, as a prompt from a user, a user request for obtaining a resource from a corporate network environment;

providing a first input to a language model for processing by the language model to identify a first interface of a first application, from one or more interfaces of each of a set of applications available in the corporate network environment, that matches the user request for obtaining the resource, wherein the first input includes the received prompt and a textual description of each of the one or more interfaces of each of the set of applications;

in response to identifying the first interface that matches the user request for obtaining the resource by using the language model, obtaining a requirement description of the first interface based on executing, by using a name of the first interface, a search at an online resource provider that stores technical documentation for the one or more interfaces;

providing a second input to the language model for processing by the language model to generate a network request definition for a call to be directed to the first interface, the second input comprising the requirement description of the first interface obtained at a result of executing the search at the online resource provider and the prompt received from the user, wherein the second input to the language model is to serve as context for generating the network request definition for the call to be directed to the first interface;

sending the call to the first interface of the first application based on the network request definition generated by the language model;

in response to the sending of the call to the first interface, obtaining the requested resource from the first application; and providing the requested resource obtained by sending the call to the first interface of the first application to the user in response to the received prompt, wherein the first interface of the first application is identified as matching the received prompt by using the language model from the one or more interfaces of each of the set of applications available in the corporate network environment.

10. The non-transitory, computer-readable medium of claim 9, comprising instructions which when executed by the computer perform operations comprising:

providing third input to the language model to request generation of a human readable output, wherein, the third input comprises the requested resources and the received prompt.

11. The non-transitory, computer-readable medium of claim 10, wherein the third input comprises a definition of a format of a user interface supported by the digital assistant to be used for generating the human readable output.

12. The non-transitory, computer-readable medium of claim 10, comprising instructions which when executed by the computer perform operations comprising:

in response to receiving the generated human readable output from the language model, providing the generated human readable output at a user interface of a display device coupled to the digital assistant, wherein the generated human readable output is provided as interactive content.

13. The non-transitory, computer-readable medium of claim 9, wherein obtaining the requirement description of the first interface comprises obtaining text content of a specified resource mapped to the first interface from a storage separate from the language model.

14. The non-transitory, computer-readable medium of claim 9, wherein obtaining the requirement description of the first interface comprises obtaining text content of a specified resource mapped to the first interface; and wherein the non-transitory, computer-readable medium comprises instructions which when executed by the computer perform operations comprising:

maintaining a mapping between interfaces provided by the set of applications associated with the corporate network environment and resources providing content usable for obtaining requirement descriptions of the interfaces.

15. A digital assistant system comprising a computing device; and a computer-readable storage device coupled to the computing device and having instructions stored thereon which, when executed by the computing device, cause the computing device to perform operations, the operations comprising:

receiving, as a prompt from a user, a user request for obtaining a resource from a corporate network environment;

providing a first input to a language model for processing by the language model to identify a first interface of a first application, from one or more interfaces of each of a set of applications available in the corporate network environment, that matches the user request for obtaining the resource, wherein the first input includes the received prompt and a textual description of each of the one or more interfaces of each of the set of applications;

in response to identifying the first interface that matches the user request for obtaining the resource by using the language model, obtaining a requirement description of the first interface based on executing, by using a name of the first interface, a search at an online resource provider that stores technical documentation for the one or more interfaces;

providing a second input to the language model for processing by the language model to generate a network request definition for a call to be directed to the first interface, the second input comprising the requirement description of the first interface obtained at a result of executing the search at the online resource provider and the prompt received from the user, wherein the second input to the language model is to serve as context for generating the network request definition for the call to be directed to the first interface;

sending the call to the first interface of the first application based on the network request definition generated by the language model;

in response to the sending of the call to the first interface, obtaining the requested resource from the first application; and providing the requested resource obtained by sending the call to the first interface of the first application to the user in response to the received prompt, wherein the first interface of the first application is identified as matching the received prompt by using the language model from the one or more interfaces of each of the set of applications available in the corporate network environment.

16. The system of claim 15, wherein the computer-readable storage device has instructions stored thereon which, when executed by the computing device, cause the computing device to perform operations comprising:

providing third input to the language model to request generation of a human readable output, wherein, the third input comprises the requested resources and the received prompt.

17. The system of claim 16, wherein the third input comprises a definition of a format of a user interface supported by the digital assistant to be used for generating the human readable output.

18. The system of claim 16, wherein the computer-readable storage device has instructions stored thereon which, when executed by the computing device, cause the computing device to perform operations comprising:

in response to receiving the generated human readable output from the language model, providing the generated human readable output at a user interface of a display device coupled to the digital assistant, wherein the generated human readable output is provided as interactive content.

19. The system of claim 15, wherein obtaining the requirement description of the first interface comprises obtaining text content of a specified resource mapped to the first interface from a storage separate from the language model.

20. The system of claim 15, wherein obtaining the requirement description of the first interface comprises obtaining text content of a specified resource mapped to the first interface; and wherein the computer-readable storage device has instructions stored thereon which, when executed by the computing device, cause the computing device to perform operations comprising:

maintaining a mapping between interfaces provided by the set of applications associated with the corporate network environment and resources providing content usable for obtaining requirement descriptions of the interfaces.

* * * * *